United States Patent [19]

Lucchetta et al.

[11] Patent Number: 5,195,259
[45] Date of Patent: Mar. 23, 1993

[54] SHEATH FASTENING DEVICE, PARTICULARLY FOR SKI BOOTS

[75] Inventors: Faustino Lucchetta, Treviso; Walter Trevisan, Venegazzu', both of Italy

[73] Assignee: Nordica S.p.A., Montebelluna, Italy

[21] Appl. No.: 714,536

[22] Filed: Jun. 13, 1991

[30] Foreign Application Priority Data

Jun. 22, 1990 [IT] Italy ................. 82592 A/90

[51] Int. Cl.⁵ .............................. A43B 5/04
[52] U.S. Cl. ........................... 36/117; 36/114
[58] Field of Search .................. 36/117–121, 36/109, 114, 132, 136, 50; 74/502.4

[56] References Cited

U.S. PATENT DOCUMENTS

| 4,551,932 | 11/1985 | Schoch | 36/117 |
| 4,669,153 | 6/1987 | Olivieri | 36/50 |
| 4,719,670 | 1/1988 | Kurt | 36/119 |
| 4,805,479 | 2/1989 | Brightwell | 74/502.4 |
| 4,823,484 | 4/1989 | Couty | 36/50 |
| 4,905,384 | 3/1990 | De Marchi et al. | 36/50 |

FOREIGN PATENT DOCUMENTS 317889 5/1989 European Pat. Off. .

*Primary Examiner*—Jimmy G. Foster
*Assistant Examiner*—Thomas P. Hilliard
*Attorney, Agent, or Firm*—Guido Modiano; Albert Josif

[57] ABSTRACT

A sheath fastening device for cable sheaths of ski boots, including a body which is axially perforated for the passage of a cable, and for fastening at least one portion of the sheath to the boot. The body furthermore has flaps for temporary engagement with at least one through seat defined on the boot.

10 Claims, 1 Drawing Sheet

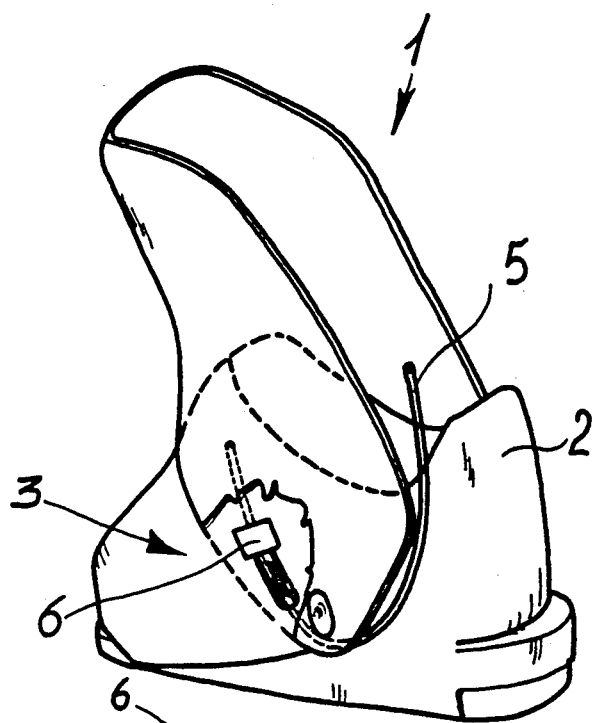
Fig. 1
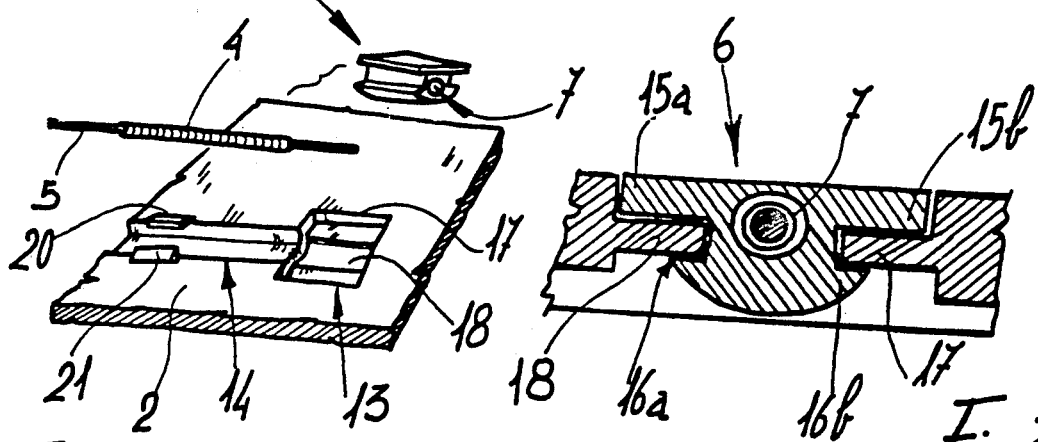
Fig. 2
Fig. 3
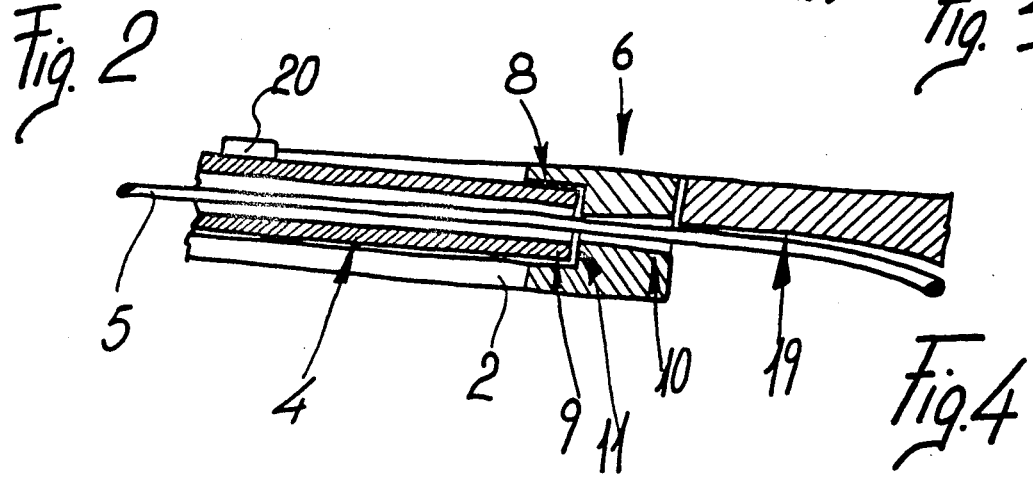
Fig. 4

SHEATH FASTENING DEVICE, PARTICULARLY FOR SKI BOOTS

BACKGROUND OF THE INVENTION

The present invention relates to a sheath fastening device, particularly for ski boots.

The use, in ski boots, of cables adapted to control fastening or securing means and slidably arranged within sheaths, is currently known. The sheaths are usually arranged in hidden parts of the boot, such as the inside of the shell or of the quarters.

Bridges, also termed sheath clips, are usually employed to allow the optimum connection of said sheaths to the boot, and their ends are riveted to the boot.

This construction has disadvantages: high costs and long assembly times due to the need to rivet the bridges at preset points of the boot, with at least one pair of rivets on each side.

In case of breakage of said bridges, it is furthermore necessary to have appropriate tools or instruments for replacing them; said tools and instruments are certainly not available to the user.

SUMMARY OF THE INVENTION

The aim of the present invention is therefore to eliminate the disadvantages described above in known types by providing a device which allows to achieve a rapid coupling between the boot and one or more sheaths.

Within the scope of this aim, an important object is to provide a device which can be handled even by people who have not been trained specifically and without using particular tools or instruments.

Another important object is to provide a device which associates with the preceding characteristics that of allowing an easy connection to one or more parts of the boot.

Still another object is to provide a device which has modest manufacturing costs.

Not least object is to provide a device which associates with the preceding characteristics that of being reliable and safe in use.

This aim, these objects and others which will become apparent hereinafter are achieved by a sheath fastening device, particularly for cable sheaths of ski boots, characterized in that it comprises a body which is axially perforated for the passage of at least one traction element and the fastening of at least one portion of said sheath to the boot, provided with means for temporary engagement with at least one through seat defined on said boot.

BRIEF DESCRIPTION OF THE DRAWINGS

Further characteristics and advantages will become apparent from the detailed description of a particular but not exclusive embodiment, illustrated only by way of non-limitative example in the accompanying drawings, wherein:

FIG. 1 is a perspective view of the sheath fastening device according to the invention, applied at the shell of a boot;

FIG. 2 is an exploded view of the device;

FIG. 3 is a partially sectional view, taken transversely with respect to the through seat;

FIG. 4 is a sectional view taken along a plane which is longitudinal to the through seat.

DESCRIPTION OF THE PREFERRED EMBODIMENTS

With reference to the above figures, the reference numeral 1 indicates a ski boot which comprises a shell 2 with which it is possible to removably associate the fastening device, generally indicated by the reference numeral 3, for a sheath 4 inside which a traction element, such as a cable 5, is slidably associated.

The fastening device 3 is constituted by a body 6 which has an essentially parallelepipedal shape and longitudinally to which at least one hole 7 is defined.

The diameter of a first portion 8 of said hole is slightly larger than that of an end 9 of the sheath 4, which is removably insertable therein.

A second portion 10, with a reduced diameter which is slightly larger than that of the cable 5, is provided sequentially with respect to the first portion 8.

It is thus possible to insert the end 9 of the sheath 4 within the first portion 8 of the hole 7; said end abuts at the step-like discontinuity 11 defined between the first portion 8 and the second portion 10, whereas the cable 5 is free to slide through the hole 7.

Said body 6 and said sheath 4 are temporarily associable respectively at least at a first seat and a second seat which are indicated by the numerals 13 and 14, are sequential with respect to one another and are defined in any region of the boot, such as for example a region arranged laterally to the shell 2.

The first seat 13 passes through the shell 2, whereas the second seat 14 only partially affects the thickness thereof.

The body 6 has means for temporary engagement with the first seat 13 which are constituted by two pairs of lateral flaps 15a, 15b and 16a, 16b between which two tabs 17 and 18, which protrude transversely to the first seat 13, can be arranged.

Advantageously, the pair of flaps 16a and 16b, which is arranged on a lower plane with respect to that of the pair of flaps 15a and 15b, has a smaller transverse extension, so as to allow, once a pressure has been applied to the body 6, the insertion thereof into the first seat 13 without having to use fixed connection means such as rivets.

Furthermore, once an effort has been exerted on the body 6 in a direction which is opposite to the preceding one for its removal from the first seat 13, the elastic deformation of the tabs 17 and 18 allows the simple and rapid extraction of said body 6.

A recess for the optimum passage of the cable 5 is defined at the internal surface 19 of the shell 2.

The second seat 14 is defined axially with respect to the first seat 13, since said second seat accommodates the sheath 4.

In order to allow the temporary fastening of said sheath to said shell 2, a pair of shoulders 20 and 21 protrudes laterally with respect to the second seat 14; said shoulders are slightly curved in the direction of said second seat, and their elastic deformation allows the snap-together insertion and extraction of the sheath 4.

The use of the fastening device is thus as follows: once the sheath has been associated with the cable, and once said cable has been inserted in the hole 7, it is sufficient to arrange the body 6 within the first seat 13 and the sheath within the second seat 14, fastening the sheath at the shoulders 20 and 21.

The configuration of the hole 7 allows to lock the sheath while the cable is free to slide.

It has thus been observed that the invention has achieved the intended aim and objects, a fastening device having been obtained which allows to achieve a rapid and easy connection between the boot and one or more sheaths, both during the assembly of the boot and in a possible maintenance operation performed by the skier to replace the body 6 after possible breakage.

The device furthermore has modest manufacturing and installation costs.

The device according to the invention is naturally susceptible to numerous modifications and variations, all of which are within the scope of the same inventive concept.

The materials and the dimensions which constitute the individual components of the device may naturally be the most appropriate according to the specific requirements.

We claim:

1. A sheath fastening device for fixing a sheath which slidably carries a traction element to a ski boot portion, the sheath fastening device comprising a body which is axially provided with a longitudinal hole, said longitudinal hole having a first portion with a diameter which is slightly larger than an outer diameter of an end portion of said sheath, said end portion of said sheath being removably inserted inside said first portion of said longitudinal hole of said body, said longitudinal hole having a second portion which is provided sequentially to said first portion, said second portion having a diameter being smaller than said diameter of said first portion and being slightly larger than an outer diameter of said traction element, said traction element exiting from said end portion of said sheath and being slidably inserted inside said second portion of said longitudinal hole, said body being provided with means for temporarily fixing said body to a first seat defined on said ski boot portion, said means for temporarily fixing comprising two pairs of lateral flaps between which two tabs of said ski boot portion protruding transversely to said first seat are removably arranged, thereby to removably fix said body and said sheath to said ski boot portion.

2. The sheath fastening device according to claim 1, wherein said body has an essentially parallelepipedal shape.

3. The sheath fastening device according to claim 1, wherein said ski boot portion is provided with a second seat arranged adjacent to said first seat, a portion of said sheath extending from said end portion thereof being removably accommodated in said second seat.

4. The sheath fastening device according to claim 3, wherein said first seat is a through seat with respect to said ski boot portion and said second seat affects a thickness of said ski boot portion only partially.

5. The sheath fastening device according to claim 1, wherein said two pairs of lateral flaps comprise a first pair of lateral flaps arranged internally of said ski boot portion when said body is fixed to said ski boot portion, and a second pair of flaps arranged externally of said ski boot portion when said body is fixed to said ski boot portion, said two tabs being elastically deformable and said first pair of lateral flaps having a transverse extension which is smaller than a transverse extension of said second pair of lateral flaps.

6. The sheath fastening device according to claim 1, wherein said ski boot portion is provided with a second seat arranged adjacent to said first seat, a portion of said sheath extending from said end portion thereof being removably accommodated in said second seat, and wherein a recess is provided internally at said ski boot portion adjacent said first seat at an opposite side thereof with respect to said second seat for slidably accommodating said traction element exiting from said first portion of said longitudinal hole of said body.

7. The sheath fastening device according to claim 1, wherein said ski boot portion is provided with a second seat arranged adjacent to said first seat, a portion of said sheath extending from said end portion thereof being removably accommodated in said second seat, said first portion of said longitudinal hole being adjacent to said second seat once said body has been inserted in said first seat.

8. The sheath fastening device according to claim 1, wherein a step-like discontinuity is defined between said first portion and said second portion of said longitudinal hole in said body, said end portion of said sheath abutting at said step-like discontinuity.

9. The sheath fastening device according to claim 3, wherein said second seat is defined axially with respect to said first seat.

10. The sheath fastening device according to claim 3, wherein a pair of shoulders protrudes laterally to said second seat, said shoulders being slightly curved toward said second seat, said shoulders being elastically deformable for allowing a snap-together insertion and extraction of said portion of said sheath.

* * * * *